March 7, 1950 J. E. MAGOFFIN ET AL 2,500,039
ELECTROLYTIC METHOD OF PREPARING MANGANESE DIOXIDE
Filed July 13, 1945
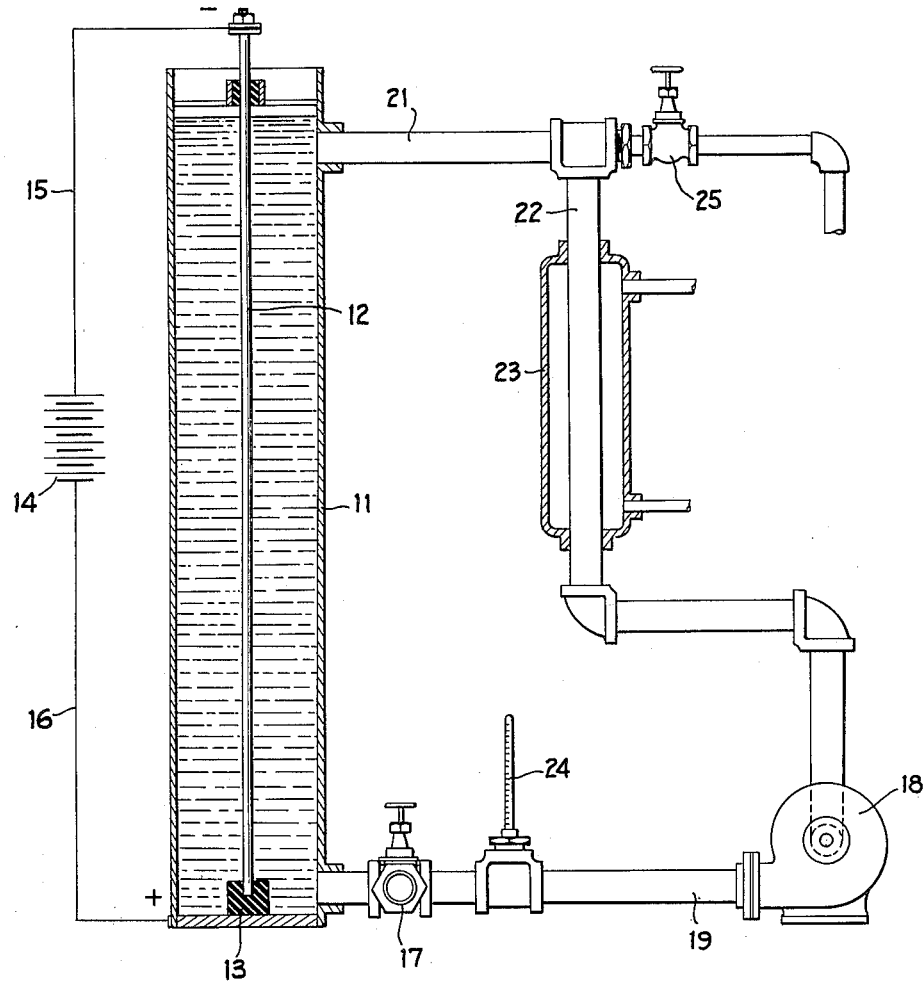
JAMES E. MAGOFFIN
THOMAS E. VANCE
INVENTORS
BY
ATTORNEYS Patented Mar. 7, 1950

2,500,039

UNITED STATES PATENT OFFICE 2,500,039

ELECTROLYTIC METHOD OF PREPARING MANGANESE DIOXIDE

James E. Magoffin and Thomas Edgar Vance, Kingsport, Tenn., assignors to Eastman Kodak Company, Rochester, N. Y., a corporation of New Jersey Application July 13, 1945, Serial No. 604,862

1 Claim. (Cl. 204—83)

This invention relates to a method and solution for preparing manganese dioxide, and more particularly to an electrolytic method for preparing a relatively pure and chemically active manganese dioxide.

Manganese dioxide occurs in nature in several different ores all of which are relatively impure. In several chemical processes where manganese dioxide is used, the presence of such impurities as are found in the natural occurring ores renders the material less active and, therefore, not completely satisfactory for some uses. There are several chemical processes which could employ manganese dioxide as an oxidizing agent if a relatively pure and active form were available.

In many manganese ores the manganese occurs in a lower valence state, and, therefore, it cannot be utilized as an oxidizing agent. Processes for oxidizing the manganese in such ores, or oxidizing manganese salts, such as are obtained in certain processes using manganese ores are known to the art. For example, manganese sulphate in a water solution can be converted to manganese dioxide by the passage of an electric current therethru, using metallic lead as an anode. The current efficiency is not high and the resulting product is hard, dense, and not very active chemically. It is also known that divalent manganese can be oxidized to manganese dioxide by atmospheric air or gaseous oxygen. By these processes, however, usually only less than 50% of the manganese can be converted and the final products contain less than 50% manganese dioxide. It can readily be seen that these processes are not practicable or economical.

It is an object of this invention to provide a method for the preparation of relatively pure and chemically active manganese dioxide which is suitable for use as a chemical reagent. Another object of the invention is to provide a method for converting manganese salts, which may be by-products of chemical processes employing manganese compounds, into a relatively pure and active form of manganese dioxide. Another object is to provide a method of converting manganese of a lower valence state as found in ores to a chemically active state. Another object is a process of converting low grade manganese dioxide ores into manganese dioxide of high purity and activity. Still another object of the invention is an electrolytic method of continuously oxidizing a basic slurry of manganous hydroxide to an active form of manganese dioxide. A further object is a solution containing a basic slurry of manganous hydroxide which is effectively adapted to be employed in the process.

In accordance with the invention these and other objects are attained by forming a basic suspension of manganous hydroxide by dissolving manganese sulphate in water and adding a basic hydroxide to convert the manganese to manganous hydroxide. A pure and chemically active form of manganese dioxide is then produced by passing an electric current thru this basic manganous hydroxide slurry. Preferably this is done in an electrolytic cell having an anode and cathode with associated means for causing the basic slurry to flow continuously thru the cell and for drawing manganese dioxide from the cell. However, the process is adapted to either continuous or batch operation. While other bases, such as sodium and potassium hydroxide may be employed to form manganese hydroxide from manganese sulphate, we prefer to employ ammonium hydroxide which may be added in an excess over that required to convert the manganese to manganous hydroxide. Solutions of manganese sulphate of from 8 to 20% concentration can be employed although we have found that 16% concentration works extremely well. The molar ratio of ammonium hydroxide to manganese sulphate is important and has great influence on the efficiency of the process. We have found that the minimum molar ratio of ammonia to manganese sulphate is approximately 6.0 to 1.0 and the maximum ratio is approximately 9.0 to 1.0. Between these values the oxidation operates very efficiently whereas below or above these limits the efficiency falls off very rapidly.

The current density at the anode is extremely important and we have discovered that the maximum utilization of electric energy in converting manganese sulphate to manganese dioxide is obtained between these limits: 0.1 ampere per square inch to 0.3 ampere per square inch.

The invention will be more clearly understood from the accompanying detailed description and drawing which shows in schematic form electrolytic apparatus for producing purified manganese dioxide.

Referring to the drawing there is shown an electrolytic cell apparatus comprising a hollow cylindrical cell chamber 11 closed at the lower end which also serves as the cell anode, a cathode rod 12 is mounted approximately concentric within chamber 11 being insulated from the base of the cell by insulator 13. A source of direct current 14 is connected to the cathode 12 thru wire 15 and to the anode 11 thru wire 16. An ammoniacal slurry of manganous hydroxide is introduced into the electrolytic cell system thru valve 17. When a sufficient volume has been introduced into the cell system valve 17 is closed and circulating pump 18 is set in operation. This pumping action causes the slurry to flow thru pipe line 19 into the base of the cell 11 and out thru pipe line 21 at the top of the cell and thru heat exchanger 23 in line 22 back to pump 18 which again recirculates the cooled slurry thru the cell. The slurry can be circulated thru the heat exchanger 23 several times until it reaches the required temperature as shown by thermometer 24 inserted in line 19 before the current is passed thru the cell. The slurry containing precipitated manganese dioxide is withdrawn from the system thru valve 25 and further treated as described in the examples subsequently given.

While the cell employed for carrying out this electrolytic oxidation can be made of various materials, we have found that the cell chamber or anode 11 can be made from iron or steel pipe with an iron plate welded across the bottom to make it liquidtight. The cathode 12 may be a black iron or steel rod which extends toward the bottom of the cell where it is supported and insulated from the cell by a rubber or glass insulator. As other elements of the cell system are well known no specific description of them appears required to an understanding of the invention.

The apparatus can be operated either in a batch or continuous manner. If operated batchwise, the slurry of manganese hydroxide is subjected to the action of the electric current until all of the manganese has been converted to manganese dioxide, or until any desired concentration of manganese dioxide in the solid phase has been reached. If it is desired that the apparatus be operated in a continuous manner, one cell or several cells may be operated simultaneously. If more than one cell is operated, they may be operated in hydraulic series. This can be accomplished by running the slurry from one system to the intake side of the centrifugal pump in the second system, and so on. By so operating the oxidization can be divided into as many steps as is desirable.

The following are typical examples of the formation of the slurry and its oxidation in the cell to produce manganese dioxide.

Example 1

Six hundred and thirty-five parts of manganese sulphate were dissolved in 3,490 parts of water, and to this was added 1,820 parts of 28% aqueous ammonium hydroxide, a molar ratio of ammonia to manganese sulphate of 6.8–1.0. A portion of the resulting slurry was charged to the cell and subjected to the action of the electric current for eight hours. At the end of this time the remainder of the slurry was slowly fed into the cell, being introduced at the suction side of the pump at a rate of 500 c. c. per hour and an equal volume of cell liquor was withdrawn in the same length of time. The temperature of the slurry was maintained by suitable heat exchanger adjustments at between 20–25° C. for the entire run which lasted 13.8 hours. A potential of 4.5 volts was required to force a current of 50 amperes through the cell, an anode current density of 0.22 ampere per sq. in. The material withdrawn from the cell was filtered, washed free of soluble materials, dried, and analyzed for manganese dioxide. Substantially all of the solid phase was hydrated manganese dioxide of a purity of 95–98%. This product was very active chemically. Of the electrical energy introduced into the cell during the course of the reaction, 32.4% was utilized in converting manganese sulphate to manganese dioxide.

Example 2

Eleven hundred and sixty parts of rhodochrosite ore containing 19.7% manganese, were reacted with 825 parts of sulphuric acid dissolved in 3,490 parts of water. When the reaction was complete the manganese sulphate solution was clarified and 1820 parts of 28% aqueous ammonium hydroxide was added, a molar ratio of ammonia to manganese sulphate of 6.8 to 1.0. The resulting slurry of manganous hydroxide was charged to the electrolytic cell system, circulated therethrough and subjected to oxidization by current for about 26 hours. A rate of 500 c. c. per hour was used and an equal volume of cell liquor was withdrawn in the same length of time. The temperature was kept within a range of 20–25° C. for the entire run. A potential of about 4.5 volts was employed to produce a current of 50 amps. through the cell, an anode current density of 0.22 ampere per sq. in. As the oxidized slurry is removed from the cell it is filtered to remove the manganese dioxide which when washed and dried gives by analysis a manganese dioxide of 95–98% purity and of high chemical activity.

Example 3

The manganese in 800 parts of low grade manganese ore containing 28.6% manganese, was suspended in 3490 parts of water and converted to manganese sulphate by reacting with sulphur dioxide. The resulting manganese sulphate solution was clarified and treated with aqueous ammonium hydroxide, to produce manganous hydroxide. A similar electrolytic treatment as that described in Example 1 produced a high purity and chemically active manganese dioxide.

Example 4

Two hundred and eight parts of manganese sulfate were dissolved in 3,490 parts of water, and to this was added 670 parts of 28% aqueous ammonium hydroxide, a molar ratio of ammonia to manganese sulfate of 7.2 to 1.0. The resulting slurry was subjected to the action of an electric current for 6.8 hours. The temperature of the slurry was maintained at 20–25° C. for the entire run. A potential of 4.0 volts was required to force a current of 23 amperes through the cell. This produced an anode current density of 0.101 ampere per sq. in. Substantially all of the solid phase was hydrated manganese dioxide of 98% purity. Of the electrical energy introduced into the cell during the course of the run, 63% was utilized in converting the manganese sulfate to manganese dioxide.

Example 5

Seven hundred parts of manganese sulfate were dissolved in 3,490 parts of water, and to this was added 2,530 parts of 28% aqueous ammonium hydroxide. A portion of the slurry was charged to the cell and subjected to the action of the electric current for eight hours. At the end of this time, the remainder of the slurry was fed slowly into the cell, being introduced in the manner and rate of Example 1. The other conditions were the same as used in Example 1, save that the current density at the anode was 0.3 ampere per sq. in. At the end of 17 hours, substantially all of the solid phase was hydrated manganese dioxide of 98% purity. Of the electrical energy introduced into the cell, 29.5% was utilized to convert manganese sulfate into manganese dioxide.

By employing our novel solution and method we can produce a higher yield of chemically active manganese dioxide with less current expended than has been possible when acid electrolytes have been employed.

We claim:

The process of preparing manganese dioxide of a high purity and relatively uniform particle size which comprises preparing an ammoniacal slurry of manganese hydroxide by reacting manganese sulphate of a concentration of 8 to 20% in an aqueous solution with ammonium hydroxide in a molar ratio of ammonium hydroxide to manganese sulphate within the range of 6.0 to 1.0 to 9.0 to 1.0, passing this slurry of manganese hydroxide through a cell containing an anode and a cathode, passing an electric current at a current density at said anode of from 0.1 to 0.3 ampere per square inch through the slurry in the cell whereby manganese dioxide precipitates in the slurry while maintaining the temperature of the slurry within the range of from 20 to 25° C. and separating the manganese dioxide thus formed from the slurry by filtration.

JAMES E. MAGOFFIN.
THOMAS EDGAR VANCE.

REFERENCES CITED

The following references are of record in the file of this patent:

UNITED STATES PATENTS

| Number | Name | Date |
|---|---|---|
| 1,202,006 | Ogden | Oct. 17, 1916 |
| 1,278,308 | Cullen | Sept. 10, 1918 |
| 1,322,000 | Ellis | Nov. 18, 1919 |
| 1,352,208 | Lovelace | Sept. 7, 1920 |
| 1,878,244 | Laury | Sept. 20, 1932 |
| 1,951,341 | Bradley | Mar. 20, 1934 |
| 2,122,735 | Bellone | July 5, 1938 |
| 2,299,428 | Rosetti | Oct. 20, 1942 |
| 2,417,259 | Mitchell et al. | Mar. 11, 1947 |

OTHER REFERENCES

Ser. No. 402,242, Bellone (A. P. C.), published June 15, 1943.